(12) United States Patent
Yamanouchi et al.

(10) Patent No.: US 7,277,174 B2
(45) Date of Patent: Oct. 2, 2007

(54) COLOR-MATCHING METHOD OF PAINT HAVING BRILLIANT FEELING

(75) Inventors: Akihiko Yamanouchi, Hiratsuka (JP); Akio Nakamura, Hiratsuka (JP); Ikko Matsubara, Hiratsuka (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 385 days.

(21) Appl. No.: 10/837,619

(22) Filed: May 4, 2004

(65) Prior Publication Data

US 2004/0201847 A1    Oct. 14, 2004

(51) Int. Cl.
*G01J 3/46*    (2006.01)
(52) U.S. Cl. ..................................... 356/402
(58) Field of Classification Search ................ 356/402; 523/303
See application file for complete search history.

(56) References Cited

U.S. PATENT DOCUMENTS

| | | | |
|---|---|---|---|
| 4,813,000 | A | 3/1989 | Wyman et al. |
| 6,362,885 | B1 | 3/2002 | Osumi et al. |
| 6,539,325 | B1 | 3/2003 | Numata et al. |
| 2001/0036309 | A1 | 11/2001 | Hirayama et al. |
| 2002/0149770 | A1 | 10/2002 | Kubo et al. |
| 2003/0004229 | A1* | 1/2003 | Schermacher et al. ...... 523/303 |

FOREIGN PATENT DOCUMENTS

| | | |
|---|---|---|
| JP | 2001050891 | 2/2001 |
| JP | 2004-137488 | 5/2004 |
| WO | 02/08206 | 10/2002 |

* cited by examiner

*Primary Examiner*—Gregory J. Toatley, Jr.
*Assistant Examiner*—Kara Geisel
(74) *Attorney, Agent, or Firm*—Wenderoth, Lind & Ponack, L.L.P.

(57) ABSTRACT

To provide a method for color-matching a paint having brilliant feeling whose reference blend is already known and which contains a brilliant material, comprising (1) a step of obtaining the liquid color measurement data for an enamel paint not containing a brilliant material in accordance with a paint blend excluding the brilliant material and if necessary, a paint additive from a reference paint blend of a paint having brilliant feeling whose reference paint blend is already known, (2) a step of obtaining a toned enamel paint adjusted to the liquid color measurement data for the enamel paint by blending and toning a paint material such as an elementary color paint excluding a brilliant material and if necessary, a paint additive on the basis of the liquid color measurement data for the enamel paint, and (3) a step of color-matching a paint having brilliant feeling by adding a brilliant material and if necessary, a paint additive to the toned enamel paint.

5 Claims, No Drawings

COLOR-MATCHING METHOD OF PAINT HAVING BRILLIANT FEELING

FIELD OF THE INVENTION

The present invention relates to a color-matching method capable of easily and accurately toning a paint having brilliant feeling corresponding to repetitive toning.

BACKGROUND AND PRIOR ART OF THE INVENTION

The following method and apparatus have been proposed so far in U.S. Pat. No. 4,813,000: a method and an apparatus for storing color data showing the hue, chroma, and lightness of a selected color to be toned by using a portable color meter, connecting the color data in the color meter to a computer, storing a plurality of usable paint blends in the computer, storing color data showing the hue, chroma, and lightness of each paint designated by the stored usable color formula in the computer, comparing the color data for a selected color received from the color meter with the stored color data showing each of the stored usable color blends to find most similar matching, selecting a stored paint blend shown by the color data found as the most similar matching, and thereby color-matching the selected color (refer to U.S. Pat. No. 4,813,000).

In recent years, the number of paint colors having brilliant feeling in which aluminum powder and brilliant mica powder are blended has been increased for paint colors of vehicles because personal tastes have been diversified and the aesthetic dress design has been advanced. To tone the paint colors having brilliant feeling, the color-matching method disclosed in the above U.S. Pat. No. 4,813,000 is not sufficient in toning accuracy.

U.S. Pat. No. 6,362,885 discloses a metallic-pearl-paint color-matching method for obtaining a blending quantity of a coloring material and a brilliant material coinciding with a target color of a metallic-pearl paint obtained by blending a coloring material and brilliant material, in which a proper blending ratio of a coloring material and a brilliant material is obtained by previously measuring spectral reflectances of a plurality of coated plate samples obtained by changing blending ratios of a coloring material and brilliant material to be used by a variation-angle spectrophotometer, storing the spectral reflectances in a memory of a computer, and estimating reproduced spectral reflectances while capturing a change of variation-angle spectral reflectances caused by changing quantities of a brilliant material to be added when performing toning by using the measured spectral reflectances (refer to U.S. Pat. No. 6,362,885).

In the case of this method, however, at least 5 to 6 levels of coated plate samples obtained by changing quantities of a brilliant material to be blended or blend ratios of a coloring material and the brilliant material are necessary for one color material and a lot of labor is required to prepare basic data, and because a calculation algorithm is complex, the cost of an apparatus to be used increases.

The following are entered in U.S. patent application Publication No. 2001/036309: (A) a calorimeter, (B) micro brilliant feeling measuring instrument, and (C) a plurality of paint blends, color data and micro brilliant feeling data corresponding to each paint blend, and color characteristic data for a plurality of elementary color paints and micro brilliant feeling characteristic data and moreover, the following method is disclosed: a toning method using a computer toning apparatus for paints constituted by the paint blends and a computer in which a color-matching calculation logic using the data for the paint blends and capable of corresponding to a paint having brilliant feeling (refer to U.S. patent application Publication No. 2001/036309). However, because very much labor and cost are required to enter color data corresponding to various paint blends used of this method, micro brilliant feeling data, color characteristic data for a plurality of elementary colors, and micro brilliant feeling characteristic data and the calculation algorithm is complex, the above mentioned causes the cost of an apparatus used to increase.

Moreover, Japanese Patent Laid-Open No. 2001-50891 discloses a liquid color measuring method for color-measuring a coloring liquid packed into a cell, in which a color is measured while continuously renewing the coloring liquid at a measuring portion of the cell by discharging and circulating the coloring liquid to and through a face including the measuring portion of the cell (refer to Japanese Patent Laid-Open No. 2001-50891). However, very much labor and cost are required to enter the color data corresponding to blends of paints having brilliant feeling used for this method and color characteristic data for a plurality of elementary color paints and moreover, it is necessary to discharge and circulate a coloring liquid to and through a face including a measuring portion of a cell. Therefore, the above mentioned causes the cost of an apparatus used to increase.

The following are prior-art document information relating to the invention of this application.

U.S. Pat. No. 4,813,000

U.S. Pat. No. 6,362,885

U.S. patent application Publication No. 2001/036309

Japanese Patent Laid-Open No. 2001-50891

The above both methods disclosed in U.S. Pat. No. 6,362,885 and U.S. patent application Publication No. 2001/036309 respectively have problems that when toning a paint having brilliant feeling, it is necessary to perform toning while checking the optical characteristic of a paint film including a brilliant material even in repetitive toning in which the basic blend of a paint is already known and moreover because brilliant feeling is included as a factor in addition to colors, toning becomes complex, the toning frequency until reaching a shipment pass level increases, and the number of man-hours for preparing coated plates for toning is increased.

Moreover, in the case of the method disclosed in Japanese Patent Laid-Open No. 2001-50891, though it is unnecessary to prepare coated plates for toning when toning a paint having brilliant feeling, it is impossible to completely tone a paint containing a brilliant material such as a paint having brilliant feeling whose effect cannot be confirmed before coated plates are prepared (e.g. paint blended with micro titanium) or a paint color having much less scattering factors.

It is an object of the present invention to provide a color-matching method capable of easily and accurately toning a paint whose basic blend is already known and has brilliant feeling and contributing to reduction of the toning frequency before reaching a shipment pass level.

SUMMARY OF THE INVENTION

To achieve the above object, the present inventor et al. find that the above object can be achieved by separating a color change due to blend of a coloring pigment from influences on brilliant feeling and colors due to blend of a brilliant material and thereby accomplish the present invention.

That is, the present invention provides a method for color-matching a paint having brilliant feeling whose reference blend is already known and which contains a brilliant material, comprising:

(1) a step of obtaining liquid color measurement data for an enamel paint not containing a brilliant material in accordance with a paint blend removing a brilliant material and if necessary, a paint additive from the reference paint blend of a paint having brilliant feeling whose reference paint blend is already known;

(2) a step of obtaining a toned enamel paint adjusted to the liquid color measurement data for the enamel paint by blending and toning a paint material such as a primary color paint excluding a brilliant material and if necessary, a paint additive on the basis of the liquid color measurement data for the enamel paint; and (3) a step of color-matching a paint having brilliant feeilng by adding a brilliant material and if necessary, a paint additive to the toned enamel paint.

Moreover, the present invention provides the color-matching method of the above item 1, wherein toning of the enamel paint in the above step (2) is performed by a computer in which a color-matching calculation logic operates.

Furthermore, the present invention provides the color-matching method of the above item 1 or 2, wherein a coated plate is prepared for a primary toned paint obtained by adding a reference blend quantity of a brilliant material to the toned enamel paint obtained in the step (2) in the above step (3), the color consistency with the reference plate of a purposed paint having brilliant feeling is determined, and toning is completed when a color is acceptable but when the color is not acceptable, toning is further performed by adjusting a brilliant material.

Furthermore, the present invention provides the color-matching method of the above item 3, wherein color consistency is determined by a colorimeter and/or visual observation in the above step (3).

DESCRIPTION OF THE EXAMPLE EMBODIMENT

A color-matching method of the present invention is described below in detail.

A color-matching method of the present invention is a method for toning a paint having brilliant feeling whose reference blend is already known. Therefore, the method can be preferably used to repeatedly manufacture a toned paint for the same paint color whose reference blend is already known.

When there is not a fluctuation between lots at all in materials for manufacturing paints having brilliant feeling, it is possible to obtain a purposed color and a paint having brilliant feeling only by blending the materials in accordance with the reference blend. Actually, however, because there is a fluctuation between lots and there is also a certain fluctuation in the tinting strength of an elementary color paint containing a single type of pigment, colors may fluctuate. Therefore, even when toning a paint having brilliant feeling whose reference blend is already known, there is hardly a case in which color consistency passes in accordance with the reference blend.

A method of the present invention is a color-matching method for obtaining a purposed paint having brilliant feeling by toning an enamel paint containing no brilliant material by a liquid color measuring method and then adding a brilliant material to the toned colored enamel, which includes the following steps (1), (2), and (3).

Step (1)

Step (1) is a step of obtaining liquid color measurement data for an enamel paint not containing a brilliant material in accordance with a paint blend excluding a brilliant material and if necessary, a paint additive from the reference paint blend of the paint having brilliant feeling whose reference paint blend is already known. That is, the liquid color measurement data for the enamel paint is obtained without forming a dry film. The examples of the above brilliant material are metal powders such as aluminum powder or brilliant coating mica powder (titanium-oxide coating mica powder or iron-oxide coating mica powder). The paint additive to be excluded if necessary is a paint additive hardly influencing paint colors, the examples of which are one of an orientation adjuster (auxiliary agent for adjusting orientation of aluminum powder in paint film), paint fluidity adjuster, antifoaming agent, ultraviolet absorber, ultraviolet stabilizer, and solvent.

In Step (1), the already-known reference paint blend of a paint having brilliant feeling to be toned can use a past-result blend when toning the paint having brilliant feeling. It is preferable that the reference blend is a blend having the highest reliability at the point of time, which can use the average value of past-result blends.

Though it is allowed to obtain the liquid color measurement data for the reference enamel paint immediately before manufacturing a purposed paint having brilliant feeling, it is also allowed to previously prepare the data and store it.

Step (2)

Step (2) is a step of blending and toning a paint material such as an elementary color paint excluding a brilliant material and if necessary, a paint additive on the basis of the liquid color measurement data for the enamel paint obtained in the above Step (1) to obtain a toned enamel paint adjusted to the liquid color measurement data for the enamel paint. It is possible to computer color-match an enamel paint by using a computer in which a color-matching calculation logic operates or color-match the enamel paint by a colorimeter and/or visual observation without using computer color-matching. As a matter of course, it is also allowed to use computer color-matching and visual observation at the same time. When determining whether colors are matched by a computer in which a color-matching calculation logic operates or a calorimeter, it is possible to control the colors in accordance with a $\Delta E^*$ value by the $L^*a^*b^*$ color specification system specified in JIS Z8729 (1994).

Step (3)

Step (3) is a step of color-matching a paint having brilliant feeling by adding the brilliant material and if necessary, a paint additive excluded from the reference paint blend in Step (2) to the toned enamel paint obtained in the above Step (2). When a paint additive is added by the reference quantity in Step (2), it is not necessary to add a paint additive in Step (3).

In Step (3), it is allowed to add the reference quantity of the brilliant material at the same time or it is possible to add the brilliant material by slightly reducing the quantity of the brilliant material or slowly adding the brilliant material while observing the brilliant feeling. Because the fluctuation of the brilliant strength of a brilliant material is decreased because the industrial technology for manufacturing the brilliant material is improved, it may be acceptable to add the reference quantity of a brilliant material at the same time.

For a primary toned paint obtained by adding a brilliant material to a toned enamel paint, it is possible to determine the color consistency with the reference plate of a purposed brilliant paint. When the color consistency is acceptable in the above determination, toning is completed but when it is not acceptable, toning is further continued. It is possible to determine the color consistency by a calorimeter or visual observation. Moreover, it is allowed to use the calorimeter and visual observation at the same time. It is preferable to use a multiple-angle calorimeter capable of measuring a color from multiple angle as the calorimeter. When determining color consistency by a calorimeter, it is possible to determine whether the $\Delta E^*$value by the $L^*a^*b^*$ color specification system specified in JIS Z8729 (1994) is kept in a certain range at multiple angle such as light-receiving angles of 2 to 5 levels. The light-receiving angle denotes an angle formed between mirror-surface reflection axis and a light-receiving axis when applying light to a paint film at a certain incident angle. Measurement at three levels of light-receiving angles is preferable because it is easy to relate that the above light-receiving angles are present one each among angle ranges of 15° to 30°, 35° to 60°, and 75° to 110° with color determination by visual observation.

It is also possible to determine whether a primary toned paint obtained by adding a brilliant material to a toned enamel paint is acceptable or not in accordance with the liquid toning for determining the color of the raw paint which is the primary toned paint without preparing coated plates.

Liquid toning of a paint having brilliant feeling has a problem on accuracy at present compared to a method for performing toning in accordance with the reference plate. When a high accuracy is requested to tone a paint having brilliant feeling, it is preferable to determine the color consistency in Step (3) in accordance with the color consistency with the reference plate for a coated plate of the toned paint having brilliant feeling.

It is possible to obtain a purposed paint having brilliant feeling by completing toning when the determination result of the above color consistency is acceptable but further continuing toning when the result is not acceptable.

The present invention is more minutely described below in accordance with an embodiment.

Comparative Example 1

Toning of Red-silver-color RS Paint

To adjust a color to the reference plate of a red-silver-color RS paint, first-time blend is performed in accordance with Table 1 to be shown later and first-time blend paint is obtained. In the case of the first-time blend, aluminum paste A, aluminum paste B, and aluminum paste C are blended respectively at a quantity of 100 wt %, yellow-A elementary color is blended at a quantity of approx. 92 wt %, and black-A elementary color, red-A elementary color, yellow-B elementary color, and orientation adjuster are blended respectively at a quantity of 51 wt %. First-time toned-paint coated plate is obtained by spraying the first-time blend paint on a white base material plate so that a cured film thickness becomes 16 μm under the standard condition of the red-silver-color RS paint and baking the paint at 90° C. for 30 min. A first-time corrected blend is obtained by measuring the first-time toned-paint coated plate and the reference plate of the red-silver-color RS paint by a computer color-matching apparatus (ALESMATCH™; a product manufactured by KANSAI PAINT CO., LTD.) and performing blend calculation. As a result of preparing the toned-paint coated plate in the same manner as the above, a color difference $\Delta E^*$ is 1.71. Second- and third-time toned paints are obtained by the computer color-matching apparatus in the same manner as the above. The color difference between the third-time toned-paint coated plate and the reference plate is 0.63.

Example 1

Toning of Red-silver-color RS Paint (According to Method of the Present Invention)

An enamel paint no containing a brilliant material is prepared in accordance with a paint blend excluding a brilliant material from the reference blend obtained from the average value of actual-result blends in manufacturing a red-silver-color RS paint. The reference color data for the enamel paint is obtained by putting the enamel paint in a glass cell and measuring the liquid color of the paint by the computer color-matching apparatus (ALESMATCH™; a product manufactured by KANSAI PAINT CO., LTD.).

A first-time blend paint is prepared in accordance with the blend shown in Table 2 to be described later in order to adjust the color of the enamel paint on the basis of the reference color data for the enamel paint. In the case of the first-time blend, first-time enamel paint is obtained by blending approx. 92 wt % of yellow-A elementary color and approx. 51 wt % of black-A elementary color, red-A elementary color, yellow-B elementary color, and orientation adjuster respectively for the reference blend.

A first-time enamel corrected blend is obtained by putting the first-time enamel paint in a glass cell, performing liquid color measurement by the computer color-matching apparatus (ALESMATCH™; a product manufactured by KAN-SAI PAINT CO., LTD.) and performing blend calculation on the basis of the reference color data for the enamel paint. A first-time toned enamel paint is obtained by performing blending in accordance with the corrected blend. By putting the first-time toned enamel paint in a glass cell, measuring a liquid color by the computer color-matching apparatus (ALESMATCH™; a product manufactured by KANSAI PAINT CO., LTD.), and performing blend calculation, a second-time enamel corrected blend is obtained. Resultantly, the color difference $\Delta E^*$ between an enamel reference color and the first-time toned enamel paint is obtained as 0.91. A second-time toned enamel paint is obtained by performing blending in accordance with the second-time enamel corrected blend. As a result of putting the second-time toned enamel paint in a glass cell and measuring the paint by the computer color-matching apparatus (ALESMATCH™; a product manufactured by KANSAI PAINT CO., LTD.), the color difference $\Delta E^*$ between the enamel reference color and the second-time toned enamel paint is 0.65.

A coated plate is obtained by spraying a paint having brilliant feeling obtained by adding reference blend quantities of aluminum paste A, aluminum paste B, and aluminum paste C to the second-time toned enamel paint so that a cured film thickness becomes approx. 16 μm under the standard condition of the red-silver-color RS paint on a white base plate and baking the paint having brilliant feeling at 90° C. for 30 min. The color difference $\Delta E^*$ between the coated plate and the reference plate of the red-silver-color RS paint is 0.41 and the color consistency is also preferable by visual observation.

For reference, the color difference $\Delta E^*$ between a plate coated with a paint having brilliant feeling obtained by adding reference quantities of aluminum paste A, aluminum paste B, aluminum paste C to the first-time toned enamel paint by the same operation as the above and the reference plate of the red-silver-color RS paint is 0.69.

Comparative Example 2

Toning of Medium Chroma Gray Color MG Paint

A toned paint of the medium chroma gray color MG paint is obtained in the same manner as Comparative Example 1 except the fact of obtaining first-time blend paint by preparing first-time blend as shown in Table 3 to be described later and then successively obtaining a first-time, second-time, and third-time toned paints in accordance with blend calculations by the computer color-matching apparatus and corrected blends shown in Table 3 in Comparative Example 1. The color difference ΔE* between the third-time toned-paint coated plate and the reference plate of the medium chroma gray color MG paint is 0.69.

Example 2

Toning of Medium Chroma Gray Color MG Paint
(According to Method of the Present Invention)

An enamel paint not containing a brilliant material is prepared in accordance with a paint blend excluding the brilliant material from the reference blend obtained from the average value of actual-result blends in manufacturing the medium chroma gray color MG paint. The reference color data for the enamel paint is obtained by putting the enamel paint in a glass cell and measuring the enamel paint by the computer color-matching apparatus (ALESMATCH™; a product manufactured by KANSAI PAINT CO., LTD.).

To adjust the color of the enamel paint, first-time blend paint is prepared in accordance with the blend shown in Table 4 to be described later on the basis of the reference color data for the enamel paint. In the case of the first-time blend, first-time enamel paint is obtained by blending a quantity of approx. 80% of a black-A elementary color and quantities of 50 wt % of a blue-a elementary color, violet-A elementary color, yellow-A elementary color, and orientation adjuster for the reference blend. Then, toned enamel paints are successively obtained in the same manner as Example 1 except the fact of obtaining first-time and second-time toned paints in accordance with blend calculations by the computer color-matching apparatus and the corrected blends shown in Table 4. As a result of putting the second-time toned enamel paint in a glass cell and measuring the paint by the computer color-matching apparatus (ALESMATCH™; a product manufactured by KANSAI PAINT CO., LTD.), the color difference ΔE* between the enamel reference color and the second-time toned enamel paint is 0.28. A coated plate is obtained by applying the same operation as the case of Example 1 to a paint obtained by adding aluminum paste D and aluminum paste E serving as brilliant materials to the second-time enamel toned paint by the reference blend quantity. The color difference ΔE* between the paint coated plate and the reference plate of the medium chroma gray color MG paint is as very small as 0.38. Because the difference cannot be recognized even by visual observation, the color consistency is acceptable.

For reference, in the case of a coated plate coated with a paint having brilliant feeling obtained by adding reference quantities of aluminum paste D and aluminum pates E to the first-time toned enamel paint in accordance with the same operation as the above, the color difference ΔE* between the coated plate and the reference plate of the medium chroma gray color MG paint is 1.22.

For Comparative Examples 1 and 2 and Examples 1 and 2, visual evaluation on the coated plates in Tables I to 4 to be described later is performed in accordance with the following criteria.

Visual evaluation: Performed in accordance with the following criteria by visually observing the reference plates and coated plates coated with a paint having brilliant feeling.

A: Acceptable because difference from reference plate is not recognized.

B: Acceptable though very slight difference is recognized compared with reference plate.

C: Within shipment acceptable range because though difference is recognized compared with reference plate, it is kept within limit.

D: Shipment unacceptable because difference exceeds limit compared with reference plate.

TABLE 1

(Comparative Example 1)

|  | Reference blend | First-time toning | | | Second-time toning | | Third-time toning | |
|---|---|---|---|---|---|---|---|---|
|  |  | First-time blend | Additional quantity | Total | Additional quantity | Total | Additional quantity | Total |
| Aluminum paste A | 6.00 | 6.00 | 0.00 | 6.00 | 0.00 | 6.00 | 0.00 | 6.00 |
| Aluminum paste B | 2.93 | 2.93 | 0.00 | 2.93 | 0.00 | 2.93 | 0.00 | 2.93 |
| Aluminum paste C | 1.40 | 1.40 | 0.00 | 1.40 | 0.00 | 1.40 | 0.00 | 1.40 |
| Black-A elementary color | 2.17 | 1.10 | 0.01 | 1.11 | 1.07 | 2.18 | 0.01 | 2.19 |
| Red-A elementary color | 3.98 | 2.03 | 1.57 | 3.60 | 0.62 | 4.22 | 0.00 | 4.22 |
| Yellow-A elementary color | 22.41 | 20.53 | 0.17 | 20.70 | 1.47 | 22.17 | 1.50 | 23.67 |
| Yellow-B elementary color | 3.92 | 2.00 | 1.56 | 3.56 | 0.64 | 4.20 | 0.00 | 4.20 |
| Orientation adjuster | 1.57 | 0.80 | 0.34 | 1.14 | 0.27 | 1.41 | 0.11 | 1.52 |
| Color difference ΔE | Color difference from enamel reference liquid |  |  | — |  | — |  | — |
|  | Color difference from RS-paint reference plate |  |  | 1.71 |  | 0.85 |  | 0.63 |
| Visual evaluation |  |  |  | D |  | C |  | C |

TABLE 2

(Example 1)

|  | Reference blend | First-time blend | First-time toning | | | Second-time toning | | |
| --- | --- | --- | --- | --- | --- | --- | --- | --- |
|  |  |  | Additional quantity | Total | +Photoluminescent materials | Additional quantity | Total | +Photoluminescent materials |
| Aluminum paste A | 6.00 | — | — | — | 6.00 | — | — | 6.00 |
| Aluminum paste B | 2.93 | — | — | — | 2.93 | — | — | 2.93 |
| Aluminum paste C | 1.40 | — | — | — | 1.40 | — | — | 1.40 |
| Black-A elementary color | 2.17 | 1.10 | 1.10 | 2.20 | 2.20 | 0.00 | 2.20 | 2.20 |
| Red-A elementary color | 3.98 | 2.03 | 1.92 | 3.95 | 3.95 | 0.05 | 4.00 | 4.00 |
| Yellow-A elementary color | 22.41 | 20.53 | 2.50 | 23.03 | 23.03 | 0.01 | 23.04 | 23.04 |
| Yellow-B elementary color | 3.92 | 2.00 | 1.52 | 3.52 | 3.52 | 0.04 | 3.56 | 3.56 |
| Orientation adjuster | 1.57 | 0.80 | 0.80 | 1.60 | 1.60 | 0.00 | 1.60 | 1.60 |
| Color difference ΔE | Color difference from enamel reference liquid |  |  | 0.91 | — |  | 0.58 | — |
|  | Color difference from RS-paint reference plate |  |  | — | 0.69 |  | — | 0.41 |
| Visual evaluation |  |  |  |  | C |  |  | B |

TABLE 3

(Comparative Example 2)

|  | Reference blend | First-time blend | First-time toning | | Second-time toning | | Third-time toning | |
| --- | --- | --- | --- | --- | --- | --- | --- | --- |
|  |  |  | Additional quantity | Total | Additional quantity | Total | Additional quantity | Total |
| Aluminum paste D | 35.15 | 35.15 | 0.00 | 35.15 | 0.00 | 35.15 | 0.00 | 35.15 |
| Aluminum paste C | 10.73 | 10.73 | 0.00 | 10.73 | 0.00 | 10.73 | 0.00 | 10.73 |
| Black-A elementary color | 26.03 | 20.82 | 0.19 | 21.01 | 1.29 | 22.30 | 4.78 | 27.08 |
| Blue-A elementary color | 7.04 | 3.52 | 2.12 | 5.64 | 0.96 | 6.60 | 0.87 | 7.47 |
| Purple-A elementary color | 2.89 | 1.45 | 1.07 | 2.52 | 0.31 | 2.83 | 0.16 | 2.99 |
| Yellow-A elementary color | 4.55 | 2.28 | 0.02 | 2.30 | 0.01 | 2.31 | 0.00 | 2.31 |
| Orientation adjuster | 1.25 | 0.63 | 0.75 | 1.38 | 0.01 | 1.39 | 0.00 | 1.39 |
| Color difference ΔE | Color difference from enamel reference liquid |  |  | — |  | — |  | — |
|  | Color difference from MG-paint reference plate |  |  | 2.14 |  | 1.21 |  | 0.69 |
| Visual evaluation |  |  |  | D |  | D |  | C |

TABLE 4

(Example 2)

|  | Reference blend | First-time blend | First-time toning | | | Second-time toning | | |
| --- | --- | --- | --- | --- | --- | --- | --- | --- |
|  |  |  | Additional quantity | Total | +Photoluminescent materials | Additional quantity | Total | +Photoluminescent materials |
| Aluminum paste D | 35.15 | — | — | — | 35.15 | — | — | 35.15 |
| Aluminum paste C | 10.73 | — | — | — | 10.73 | — | — | 10.73 |
| Black-A elementary color | 26.03 | 20.82 | 2.80 | 23.62 | 23.62 | 2.58 | 26.20 | 26.20 |
| Blue-A elementary color | 7.04 | 3.52 | 2.99 | 6.51 | 6.51 | 0.49 | 7.00 | 7.00 |
| Purple-A elementary color | 2.89 | 1.45 | 1.20 | 2.65 | 2.65 | 0.10 | 2.75 | 2.75 |
| Yellow-A elementary color | 4.55 | 2.28 | 1.53 | 3.81 | 3.81 | 0.89 | 4.70 | 4.70 |
| Orientation adjuster | 1.25 | 0.63 | 0.37 | 1.00 | 1.00 | 0.30 | 1.30 | 1.30 |
| Color difference ΔE | Color difference from enamel reference liquid |  |  | 0.75 | — |  | 0.28 | — |
|  | Color difference from MG-paint reference plate |  |  | — | 1.22 |  | — | 0.38 |
| Visual evaluation |  |  |  |  | D |  |  | A |

Because a method of the present invention performs toning by enamel paints excluding brilliant materials, it is possible to easily and accurately perform toning compared to a conventional method of changing blending quantities of coloring agents (excluding brilliant material) of elementary color paints while brilliant pigments are blended. Moreover, in the case of a method of the present invention, it is possible to save labor for preparing a coated plate because toning of an enamel paint has the color consistency in raw paint.

In the case of a method of the present invention, after toning an enamel paint, a purposed toned paint having brilliant feeling is obtained by blending a brilliant material. However, the invention of Claim 4 for determining the color consistency of a paint film having brilliant feeling by visual observation and/or a colorimeter does not require a generally-expensive computer toning apparatus corresponding to brilliant feeling, which measures the color and brilliant feeling of a paint film having brilliant feeling and in which a color-matching calculation logic operates and thus, the invention of Claim 4 is advantageous in costs.

The invention claimed is:

1. A method for color-matching a paint having brilliant feeling whose reference blend is already known and which contains a brilliant material, comprising:
   (1) a step of obtaining liquid color measurement data for an enamel paint not containing a brilliant material, the enamel paint being a paint blend excluding the brilliant material from the reference paint blend of a paint having brilliant feeling whose reference paint blend is already known;
   (2) a step of obtaining a toned enamel paint adjusted to the liquid color measurement data for the enamel paint by blending and toning a paint material excluding a brilliant material on the basis of the liquid color measurement data for the enamel paint, using a paint blend of a reference color of an enamel paint not containing a brilliant material, and
   (3) a step of color-matching a paint having brilliant feeling by adding a brilliant material to the toned enamel paint,
   wherein in the above step (3), a coated plate is prepared for a primary toned paint obtained by adding a reference blending quantity of a brilliant material to the toned enamel paint obtained in the above step (2), the color consistency with the reference plate of a purposed paint having brilliant feeling is determined, and toning is completed when a color is acceptable but toning is further performed to the primary toned paint by adjusting the quantity of the brilliant material when the color of the primary toned paint is not acceptable.

2. The method according to claim 1, wherein toning of the enamel paint in the above step (2) is performed by computer color-matching an enamel paint by using a computer in which a color-matching calculation logic operates.

3. The method according to claim 1, wherein determination of the color consistency is performed by a colorimeter and/or visual observation in the above step (3).

4. The method according to claim 2, wherein determination of the color consistency is performed by a colorimeter and/or visual observation in the above step (3).

5. The method according to claim 1 wherein the paint material to be blended and toned is an elementary color paint.

* * * * *